United States Patent
Iwasaki

(10) Patent No.: US 9,464,705 B2
(45) Date of Patent: Oct. 11, 2016

(54) BALL SCREW WITH AN IMPROVED END DEFLECTOR

(71) Applicant: Kuroda Precision Industries Ltd., Kawasaki-shi, Kanagawa-ken (JP)

(72) Inventor: Yoshimi Iwasaki, Kisarazu (JP)

(73) Assignee: Kuroda Precision Industries Ltd., Kawasaki-shi, Kanagawa-ken (JP)

( * ) Notice: Subject to any disclaimer, the term of this patent is extended or adjusted under 35 U.S.C. 154(b) by 369 days.

(21) Appl. No.: 13/866,382

(22) Filed: Apr. 19, 2013

(65) Prior Publication Data
US 2013/0283953 A1    Oct. 31, 2013

(30) Foreign Application Priority Data

Apr. 27, 2012 (JP) .................................. 2012-102828

(51) Int. Cl.
*F16H 25/22* (2006.01)
*F16H 25/20* (2006.01)

(52) U.S. Cl.
CPC .......... *F16H 25/2219* (2013.01); *F16H 25/20* (2013.01); *F16H 25/22* (2013.01); *F16H 25/2204* (2013.01); *Y10T 74/19772* (2015.01)

(58) Field of Classification Search
CPC .. F16H 1/24; F16H 25/2219; F16H 25/2228; F16H 25/2214; F16H 25/2204; F16H 25/22; F16H 25/2409; Y10T 74/19772
USPC .............. 74/424.86, 424.87, 424.82, 424.81, 74/424.71, 424.5; 384/43, 44, 504
See application file for complete search history.

(56) References Cited

U.S. PATENT DOCUMENTS

| | | | | |
|---|---|---|---|---|
| 4,612,817 A | * | 9/1986 | Neff | F16H 25/2204 74/424.75 |
| 5,555,770 A | * | 9/1996 | Dolata | F16H 25/2219 403/340 |
| 7,810,406 B2 | * | 10/2010 | Chen | F16H 25/2219 74/424.86 |
| 7,845,251 B2 | * | 12/2010 | Wu | F16H 25/2219 74/424.82 |
| 9,062,748 B1 | * | 6/2015 | Guglietti | F16H 25/2214 |
| 2007/0295133 A1 | * | 12/2007 | Chen | F16H 25/2219 74/424.87 |
| 2008/0190231 A1 | * | 8/2008 | Chiu | F16H 25/2219 74/424.86 |

FOREIGN PATENT DOCUMENTS

| | | | | |
|---|---|---|---|---|
| DE | 4120495 A1 | * | 12/1992 | ......... B29C 33/0033 |
| DE | 19646245 A1 | * | 5/1997 | ......... F16H 25/2214 |
| JP | 2003-301915 A | | 10/2003 | |
| JP | 2003301915 A | * | 10/2003 | ............. F16H 25/22 |
| JP | 3124045 U | | 7/2006 | |
| JP | 2006336684 A | * | 12/2006 | ............. F16H 25/24 |

(Continued)

*Primary Examiner* — William Kelleher
*Assistant Examiner* — Joseph Brown
(74) *Attorney, Agent, or Firm* — Marshall & Melhorn, LLC

(57) ABSTRACT

In a ball screw (1), comprising a screw shaft (3), a nut (7) threaded onto the screw shaft via a plurality of balls (9) received in a raceway (8) defined between the two parts, an end deflector receiving recess (6) is formed on each axial end thereof to complementarily receive an end deflector (21) which defines a part of the raceway in cooperation with an opposing part of the nut, wherein the end deflector is provided with a pair of engagement claws (31, 32) that engage corresponding parts of the thread (4) formed on the nut. Thereby, the need for a special engagement feature or other arrangement for attachment is eliminated, and still a highly firm and accurate engagement is ensured between the nut and the end deflector.

10 Claims, 10 Drawing Sheets

(56) References Cited

FOREIGN PATENT DOCUMENTS

| | | |
|---|---|---|
| JP | 2007024305 A | 2/2007 |
| JP | 2007040469 A | 2/2007 |
| JP | 4335222 B2 | 9/2009 |
| JP | 2011241852 * | 12/2011 ............ F16H 25/24 |
| JP | 2011241852 A | 12/2011 |
| JP | 2012-021587 A | 2/2012 |
| JP | 2013-024321 A | 4/2013 |
| TW | M292649 U | 6/2006 |
| TW | I274816 B | 3/2007 |
| TW | M328521 U | 3/2008 |
| TW | 201022555 A | 6/2010 |

* cited by examiner

BALL SCREW WITH AN IMPROVED END DEFLECTOR

BACKGROUND OF THE INVENTION

The present invention relates to a ball screw including a screw shaft and a nut that are meshed with each other via a number of balls, and in particular to a ball screw having an end deflector for the balls fitted at least in one end of the nut.

The ball screw typically includes a screw shaft having a thread formed on an outer circumference thereof, a nut having a central bore and defining a thread corresponding to the thread on the screw shaft on an inner circumferential surface thereof so as to define a spiral raceway, and a plurality of steel balls received in the raceway so that the rotational motion of the screw shaft may be converted into a linear motion of the nut in a highly efficient and accurate manner. The balls exiting from one end the raceway have to be returned the other end of the raceway typically via a ball return hole passage which may be formed by an external tube member or formed in the nut itself In either case, an end deflector is formed in each axial end of the nut to pass the steel balls from the raceway to the ball return hole passage or vice versa.

JP 2007-24305A discloses a ball screw in which an end deflector consisting of two pieces is attached to each axial end of the nut by using screws. JP 2011-241852A discloses a plastic end deflector which is simply fitted into a recess formed in each axial end of the nut. A bonding agent and a retaining ring are mentioned as possible means for fixedly retaining the end deflector in the recess. An engagement feature is also disclosed as a means for retaining the end deflector which is configured to be fitted into a recess in the nut from the outer circumferential surface of the nut.

JP 2007-40469A discloses a plastic end deflector which is provided with a resilient circumferential projection fitted into a corresponding slot in the nut so as to produce a resilient torque urging the end deflector against the opposing inner circumferential surface of the recess receiving the end deflector. JP 4335222B discloses a ball screw which uses a retainer ring for securing an end deflector received in an end deflector receiving recess of the nut.

These conventional retaining structures for an end deflector either require highly complex structures or may not be suitable for adequately securely and accurately retaining the end deflector. Therefore, there is a need for a ball screw which is incorporated with an improved arrangement for securing an end deflector.

SUMMARY OF THE INVENTION

In view of such problems of the prior art, a primary object of the present invention is to provide a ball screw incorporated with an end deflector which is simple in structure and easy to assemble.

A second object of the present invention is to provide a ball screw incorporated with an end deflector which is capable of operating in a both efficient and accurate manner.

A third object of the present invention is to provide a ball screw incorporated with an end deflector which is economical.

According to the present invention, such objects can be accomplished by providing a ball screw, comprising a screw shaft having a thread formed on an outer circumference thereof, a nut having a central bore and defining a thread corresponding to the thread on the screw shaft on an inner circumferential surface thereof so as to define a spiral raceway, and a plurality of balls received in the raceway, the nut including an end deflector receiving recess formed at least on one axial end thereof to complementarily receive an end deflector which defines a part of the raceway in cooperation with an opposing part of the nut, wherein the end deflector is provided with an engagement claw that engages a part of the thread formed on the nut.

The use of the groove of the thread on the nut for engaging the corresponding claw of the end deflector eliminates the need for a special engagement feature or other arrangement for attachment and still ensures a highly firm and accurate engagement between the nut and the end deflector.

A particularly favorable engagement can be achieved in terms of both accuracy and mechanical strength when the claw includes an arcuate profile which is complementary to a corresponding contour of the thread of the nut.

To allow the engagement claw to be readily deformed without causing any undue stress to the claw or the surrounding part of the end deflector, the end deflector may be provided with a slot formed adjacent to the engagement claw.

To facilitate the assembling of the end deflector to the nut, preferably, the end deflector is configured to be inserted axially into the end deflector receiving recess, and the engagement claw is provided with an axial slope which diminishes in height toward a forward end of the engagement claw.

According to a particularly preferred embodiment of the present invention, the end deflector is provided with a sector form including a pair of radial faces, an outer circumferential face and an inner circumferential face conforming to an inner circumferential surface of the nut.

This allows not only a firm retention of the end deflector in the end deflector receiving recess but also a favorable continuation of the raceway for the balls into and away from the end deflector.

The engagement claw may be provided on each of the radial faces adjacent to the inner circumferential face of the end deflector for a stable retention of the end deflector. For a similar effect, the outer circumferential surface of the end deflector may be provided with an engagement feature that cooperates with a corresponding engagement feature provided on a corresponding part of an inner surface of the end deflector receiving recess.

When at least one of the radial faces of the end deflector includes a radially inwardly facing part which abuts an opposing inner surface part of the end deflector receiving recess, the positioning of the end deflector in the end deflector receiving recess with respect to the radial direction can be particularly accurately made.

For a particularly simple nut design, the nut may be provided with a ball return hole while the end deflector is provided with a guide recess for guiding the balls between the raceway and the ball return hole. A particularly commercially favorable result can be achieved when the screw shaft is made of metallic material, and the nut and the end deflector are made of plastic material.

BRIEF DESCRIPTION OF THE SEVERAL VIEWS OF DRAWINGS

Now the present invention is described in the following with reference to the appended drawings, in which.

DETAILED DESCRIPTION OF THE INVENTION

A ball screw 1 given as a preferred embodiment of the present invention is described in the following. In the following description, the orientations of various parts of the ball screw will be based on the definition given in FIG. 4.

Figure 1:
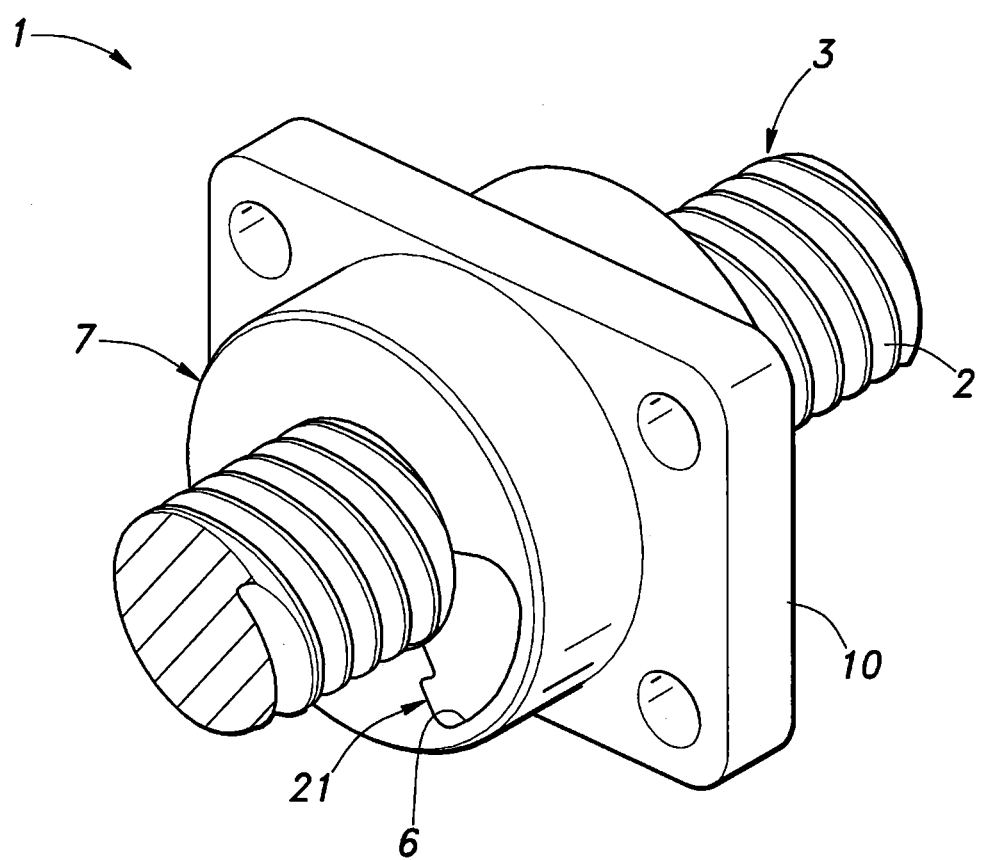
FIG. 1 is a fragmentary perspective view of a ball screw embodying the present invention.
Figure 2:
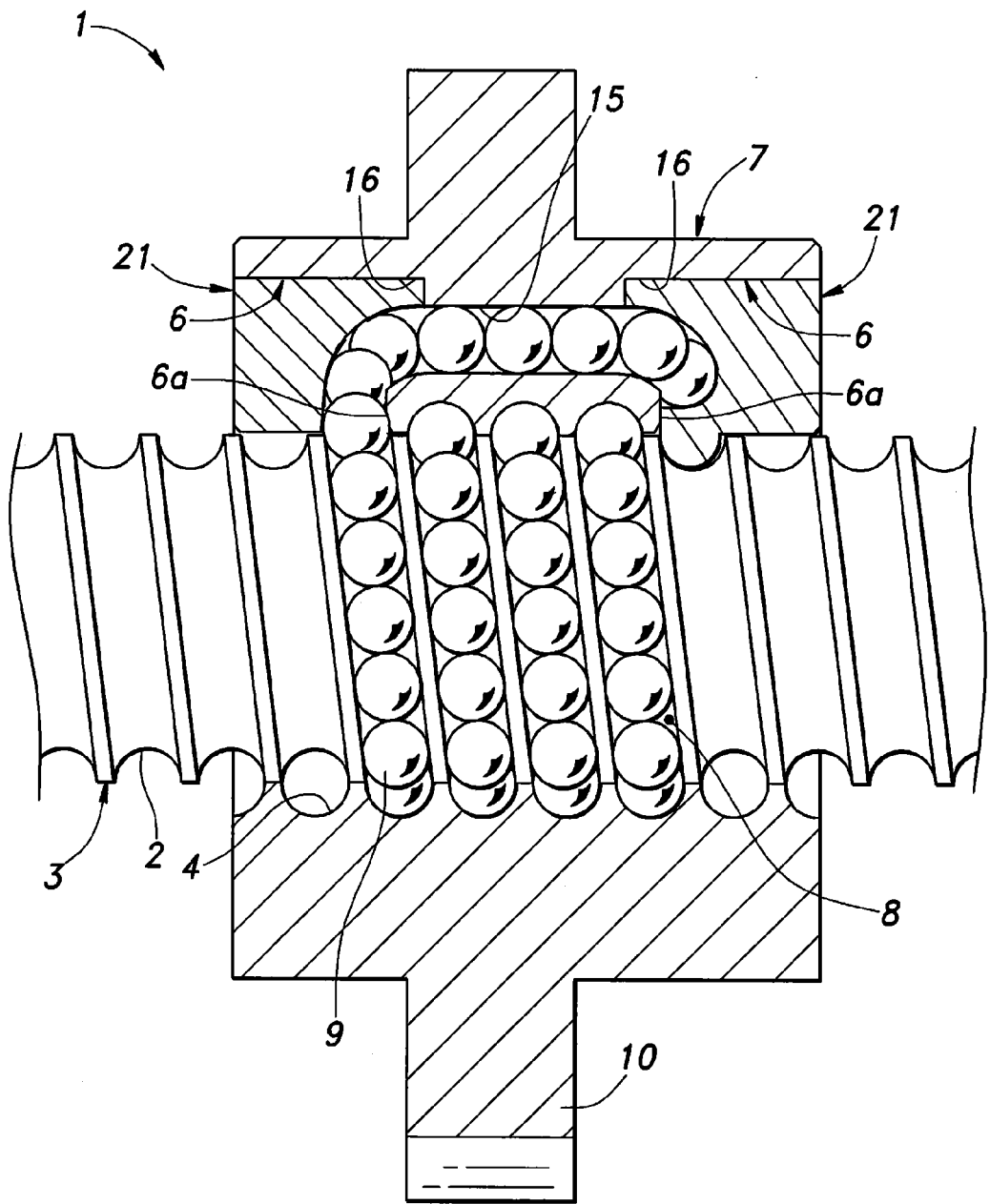
FIG. 2 is a fragmentary longitudinal sectional view of the ball screw.
Figure 3:
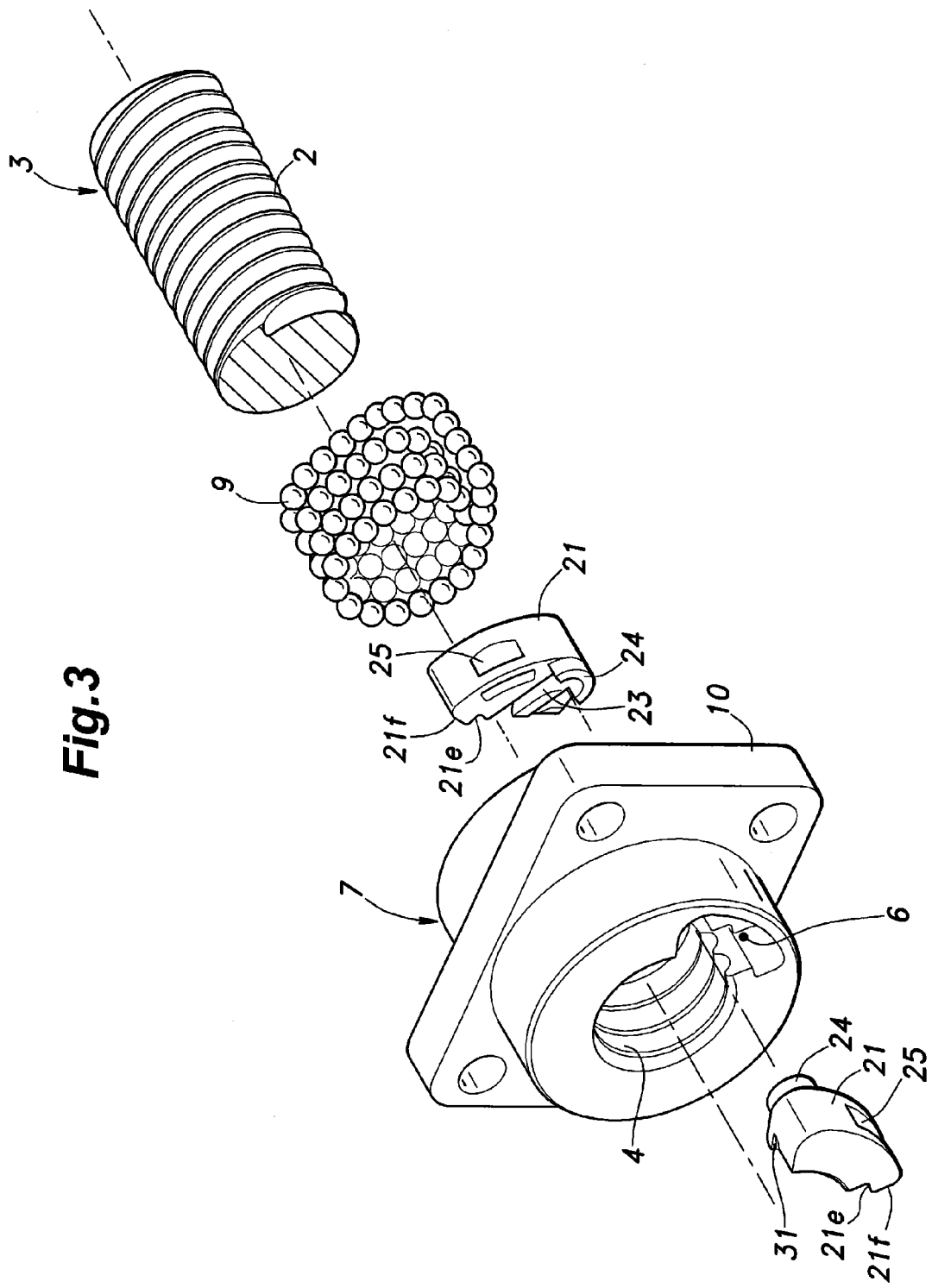
FIG. 3 is an exploded perspective view of the ball screw.

Referring to FIG. 3, the ball screw 1 includes a screw shaft 3 formed with an external thread 2 of a prescribed lead on the outer circumference thereof, and a nut 7 having a cylindrical shape and a hollow interior having an internal thread 4 (corresponding to the thread of the screw shaft 3) formed on the inner circumferential thereof. The nut 7 is engaged by the screw shaft 3 such that a helical ball raceway 8 (FIG. 2) is defined between the threads 2 and 4 of the nut 7 and the screw shaft 3. An end deflector receiving recess 6 is formed in each axial end of the nut 7 to receive a corresponding end deflector 21 therein. A ball return hole 15 extends in the nut 7 in an axial direction. Alternatively, such a ball return hole 15 may be formed by using an external member such as a pipe. A part of the ball return hole 15 may be formed by the nut 7 in cooperation with the end deflectors 21 as will be discussed hereinafter. A number of steel balls 9 are received in the ball raceway 8 and the ball return hole 15 which jointly form an endless loop of the path for the steel balls 9. As the two end deflectors 21 are essentially identical to each other, only one of them may be discussed in most of the following description.

The screw shaft 3 of the illustrated embodiment consists of a roll formed stainless steel member, and the nut 7 including the end deflectors 21 consists of injection molded plastic members. However, the screw shaft 3 may also consist of an injection molded plastic member, a bearing steel member, a carbon steel member or the like. The thread may also be formed by injection molding, machining or the like, instead of roll forming. In the illustrated embodiment, the nut 7 is formed with a rectangular flange 10 on the outer periphery thereof for attaching a member to be actuated thereto.

Figure 4:
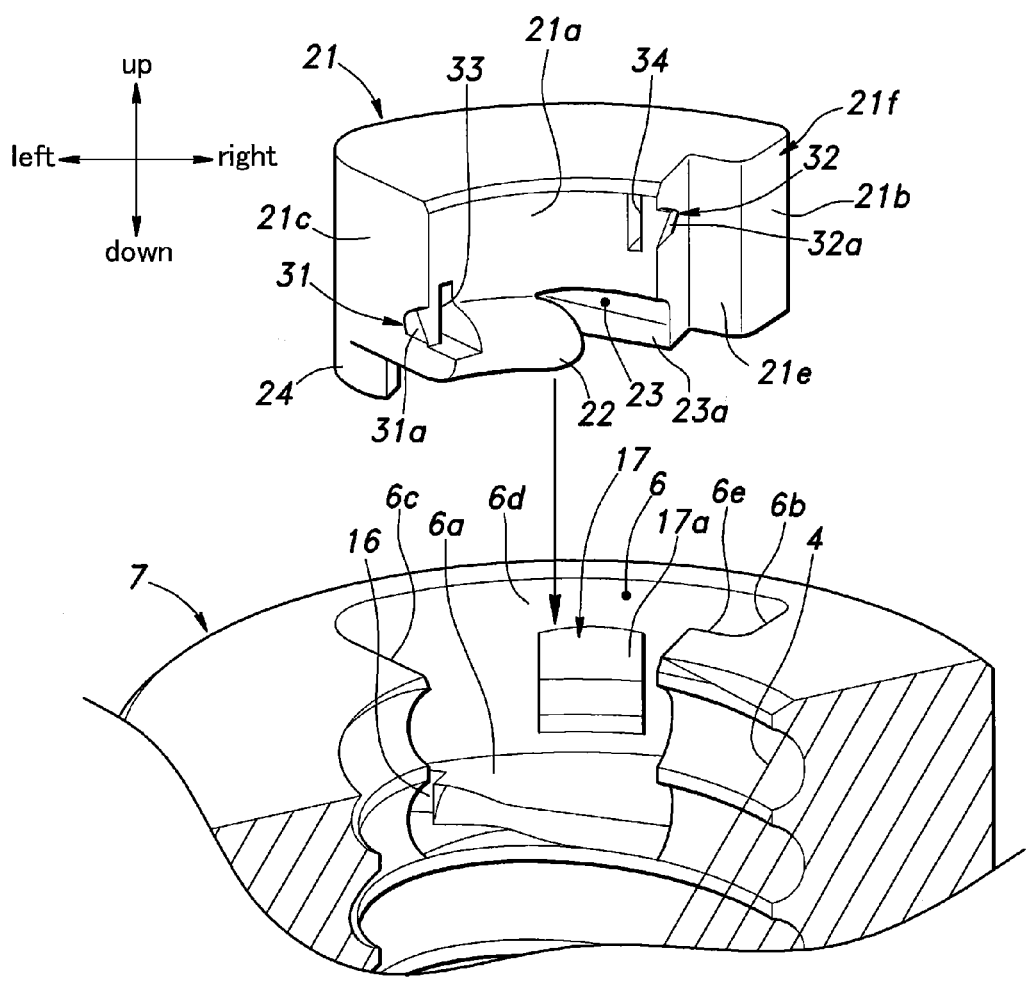
FIG. 4 is a fragmentary perspective view showing how an end deflector is fitted into an end deflector receiving recess of a nut.
Figure 5:
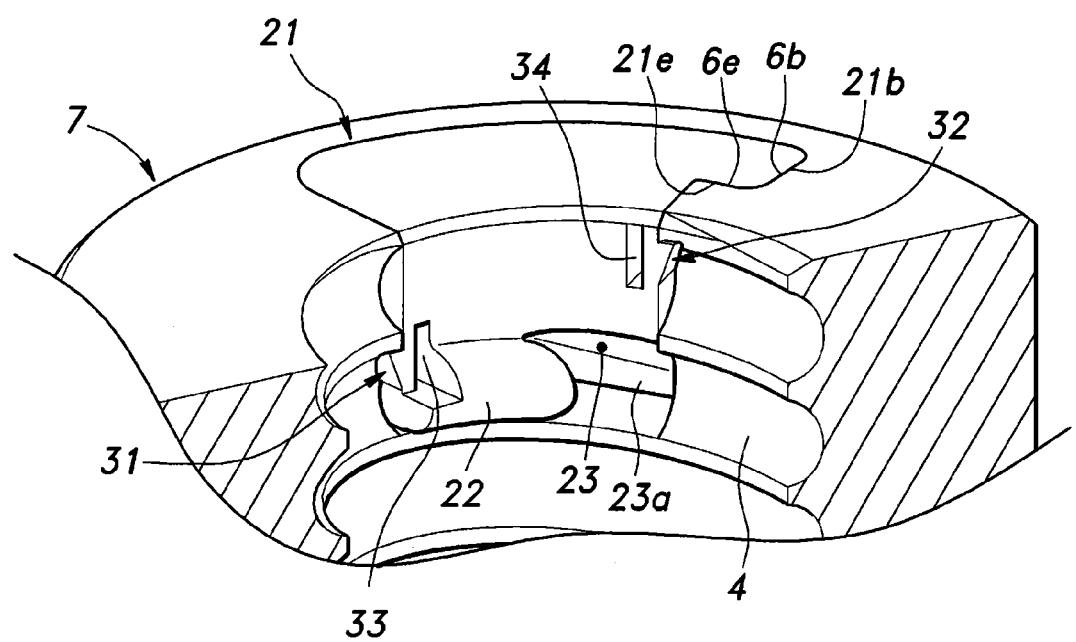
FIG. 5 is a fragmentary perspective view showing the end deflector fully fitted into the end deflector receiving recess of the nut.

Referring to FIG. 4, the left edge of each end deflector receiving recess 6 is defined by a substantially radial surface (or radially extending face) 6c which connects to an outer circumferential surface 6d thereof with a smooth curve, and the right edge of the deflector recess 6 is defined by a crank-shaped radial surface 6b such that the outer part of the right edge is circumferentially more advanced than the inner part of the right edge. Similarly as the left edge, the outer part of the right radial surface connects to the outer circumferential surface 6d of the end deflector receiving recess 6 with a smooth curve. A circular positioning recess 16 is formed in a left end of a bottom surface 6a of the end deflector receiving recess 6, and the ball return hole 15 opens out at a bottom surface of the positioning recess 16 so as to define an annular shoulder around the open end of the ball return hole 15. Thus, the end deflector receiving recess 6 is defined by a pair of radial surfaces 6b and 6c and an outer circumferential surface 6d, and the inner circumferential side of the end deflector receiving recess 6 is open toward the inner hollow part of the nut 7, defining a break in the cylindrical inner circumferential surface of the nut 7.

An engagement projection 17 is formed on the outer circumferential surface 6d of the end deflector receiving recess 6 which includes an elevated middle part, an upper gradual slope 17a that smoothly connects the elevated middle part to the base part of the outer circumferential surface 6d in the vertically upward direction and a lower steep slope that again smoothly connects the elevated middle part to the base part of the outer circumferential surface 6d in the vertically downward direction.

As best shown in FIGS. 4 to 8, the end deflector 21 is provided with a generally part-cylindrical shape or sector-shape which is complementary to the end deflector receiving recess 6. So as to correspond with the crank-shaped right radial surface 6b of the end deflector receiving recess 6, the end deflector 21 is provided with a circumferential extension 21f in the right outer part thereof. Downwardly from the left end of the bottom part of the end deflector 21 extends a semi-cylindrical extension 24 that fits into the circular positioning recess 16 in the bottom surface 6a of the end deflector receiving recess 6 and abuts the annular shoulder defined around the opening of the ball return hole 15 while defining an extension of the ball return hole 15 with an inner circumferential surface thereof.

The lower part of an inner circumferential face 21a of the end deflector 21 is provided with a circumferential guide groove 23 that smoothly connects the raceway 8 with the ball return hole 15. The left end of the lower part of the inner circumferential face 21a of the end deflector 21 is provided with a projection or a tongue 22 that is configured to scoop up or otherwise guide the balls 9 that are passed between the ball return hole 15 and the raceway 8. The lower part of the guide groove 23 is defined by a substantially vertical surface 23a for allowing the end deflector 21 to be removed from the molding die during the manufacturing process.

Figure 6:
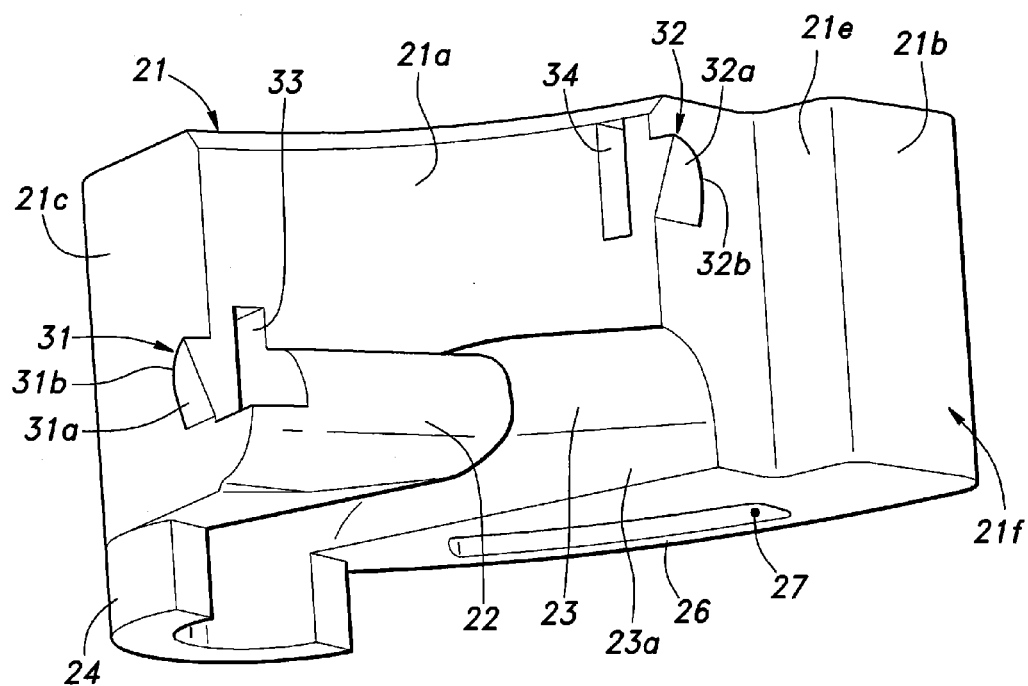
FIG. 6 is a bottom perspective view of the end deflector.
Figure 7:
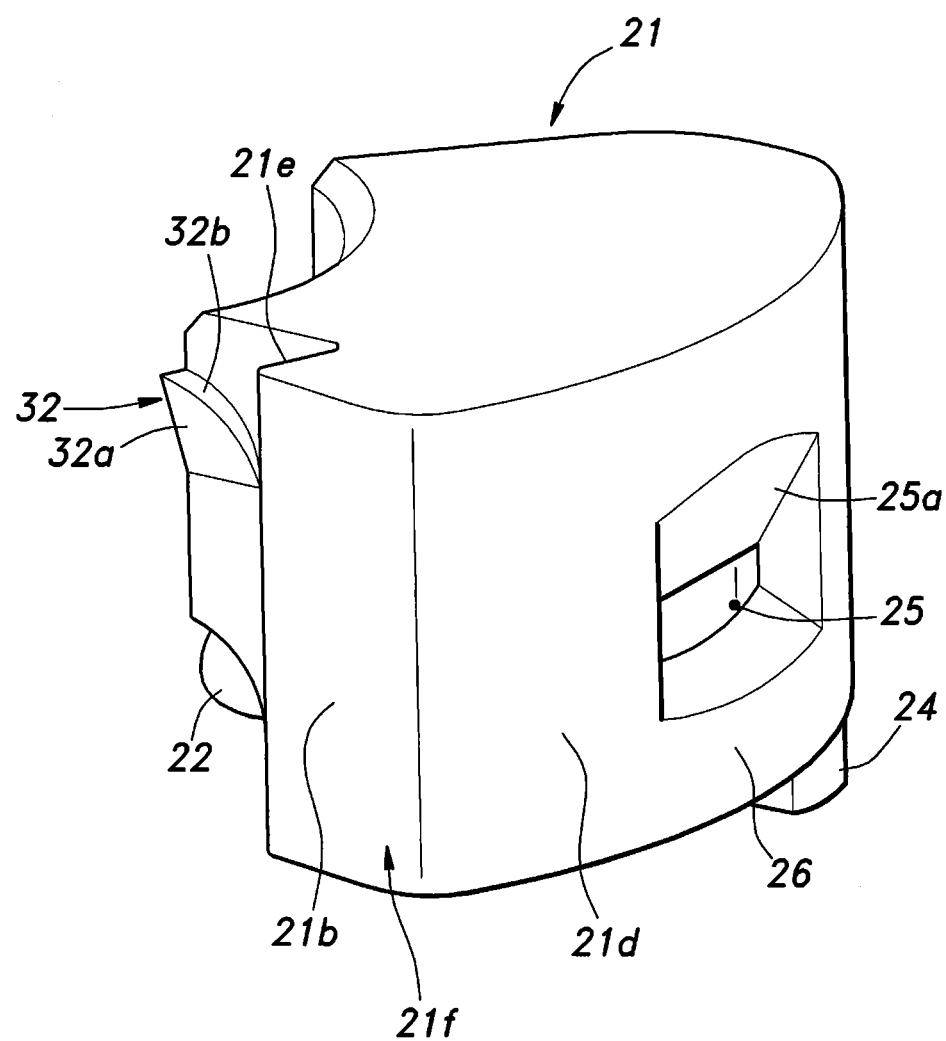
FIG. 7 is a rear perspective view of the end deflector.
Figure 8:
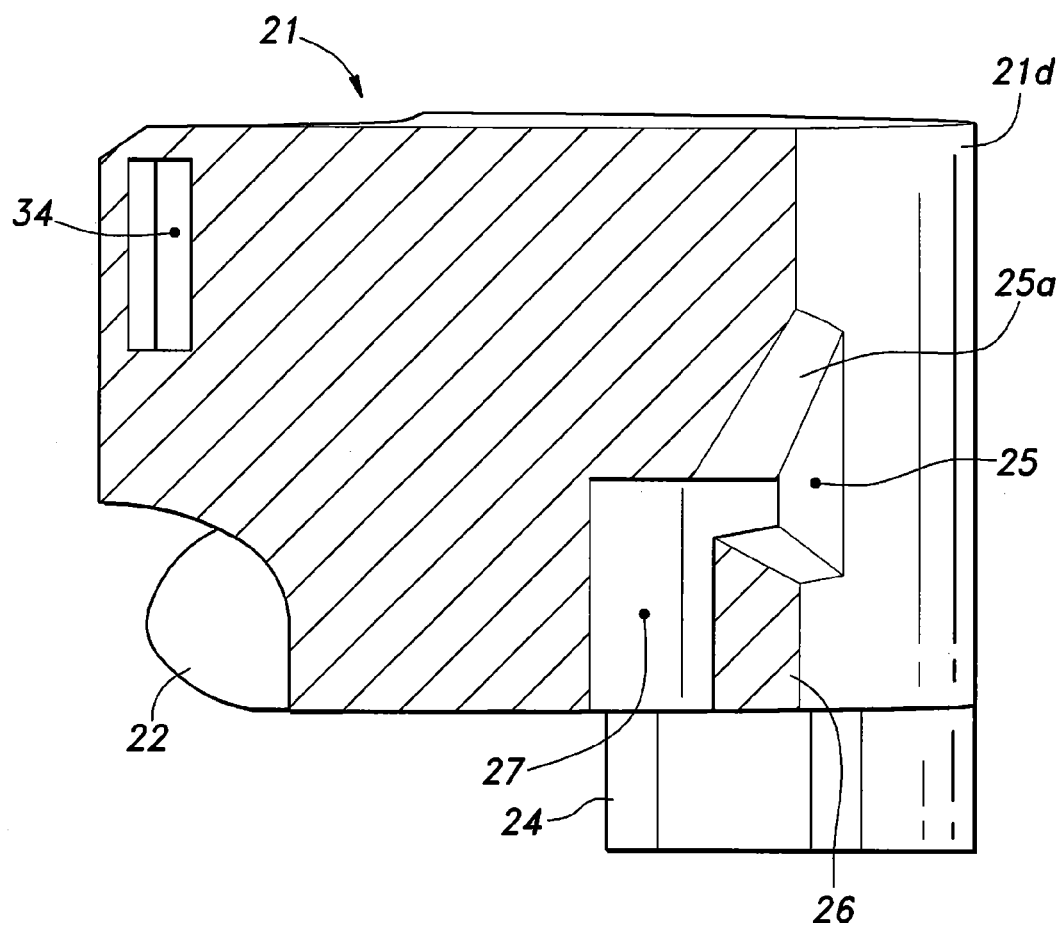
FIG. 8 is a longitudinal sectional view of the end deflector.

As shown in FIGS. 7 and 8, an outer circumferential face 21d of the end deflector 21 is formed with an engagement recess 25 which is formed with an upper slope 25a corresponding to the upper gradual slope 17a of the engagement projection 17, and is substantially complementary to the engagement projection 17. As shown in FIGS. 6 and 8, an arcuate slot 27 concentric to the end deflector 21 is formed in the boom face of the end deflector 21. In the illustrated embodiment, this slot 27 communicates with the bottom end of the engagement recess 25 although it is not essential for the present invention. Therefore, a resiliently deformable arcuate wall part 26 is formed in the middle part of the lower outer circumferential part of the end deflector 21.

As best illustrated in FIG. 6, a first engagement claw 31 is formed on a left radial face 21c of the end deflector 21 adjacent to the lower corner of the inner circumferential face thereof. This claw 31 is provided with a slope 31a which smoothly connects the projecting part of the claw 31 with the remaining part of the left radial face 21c as the slope 31a extends downward. The upper end of the claw 31 is given with an arcuate profile 31b so as to be complementary to the groove of the thread 4 of the nut 7. A slot 33 is cut under the claw 31 from the inner circumferential face 21a of the end deflector 21 to enable the claw 31 to deflect resiliently more readily.

Similarly, a second engagement claw 32 is formed on a right radial face 21b of the end deflector 21 adjacent to the upper corner of the inner circumferential face 21a thereof. This claw 32 is provided with a slope 32a which smoothly connects the projecting part of the claw 32 with the remaining part of the right face 21b as the slope 32a extends downward. The upper end of the claw 32 is also given with an arcuate profile 32b so as to be complementary to the groove of the thread 4 of the nut 7. A slot 34 is cut under the claw 32 from the inner circumferential face 21a of the end deflector 21 to enable the claw 32 to deflect resiliently more readily.

Figure 9A:
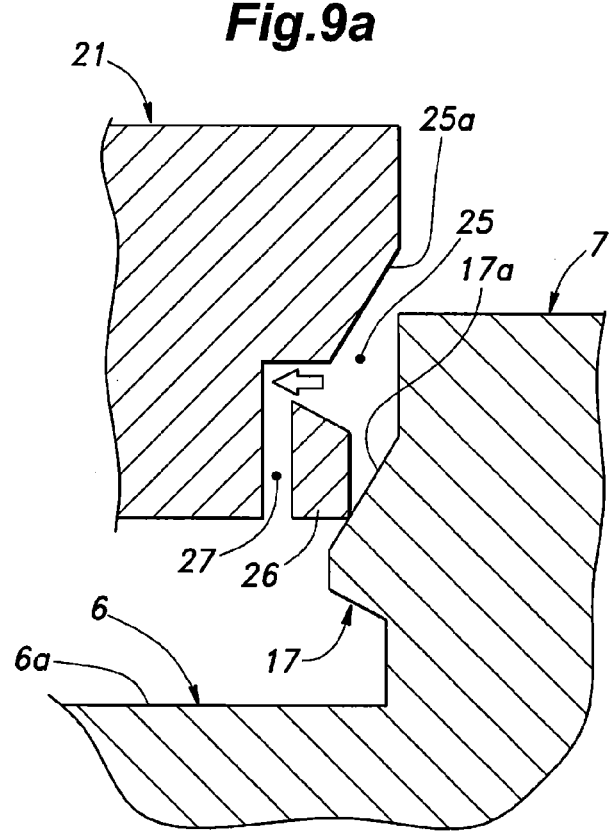
FIGS. 9a and 9b are fragmentary sectional views showing the process of fitting the end deflector into the end deflector receiving recess.

How this end deflector 21 can be assembled to the nut 7 is discussed in the following with reference to FIGS. 4, 9 and 10.

First of all, the end deflector 21 is fitted into the end deflector receiving recess 6 from above as indicated by the arrow in FIG. 4. As the outer profile of the end deflector 21 corresponds to the inner profile of the end deflector receiving recess 6 as seen in plan view, the end deflector 21 can be effortlessly forced into the end deflector receiving recess 6 until the upper gradual slope 17a of the engagement projection 17 abuts the outer circumferential face 21d of the end deflector 21 as shown in FIG. 9a. By further pushing down the end deflector 21, the end deflector 21 can be fully forced into the end deflector receiving recess 6 owing to the resilient or elastic deformation of the elastic arcuate wall part 26 of the end deflector 21. FIG. 9a shows the arcuate wall part 26 already in a slightly deflected state. This process is facilitated by the presence of the upper gradual slope 17a of the engagement projection 17 and the arcuate slot 27.

Also, as the end deflector 21 is forced into the end deflector receiving recess 6 in this manner, the first and second claws 31 and 32 are resiliently deformed by the opposing surfaces of the end deflector receiving recess 6. This process is facilitated by the presence of the slots 33 and 34 and the slopes 31a and 32a.

Figure 9B:
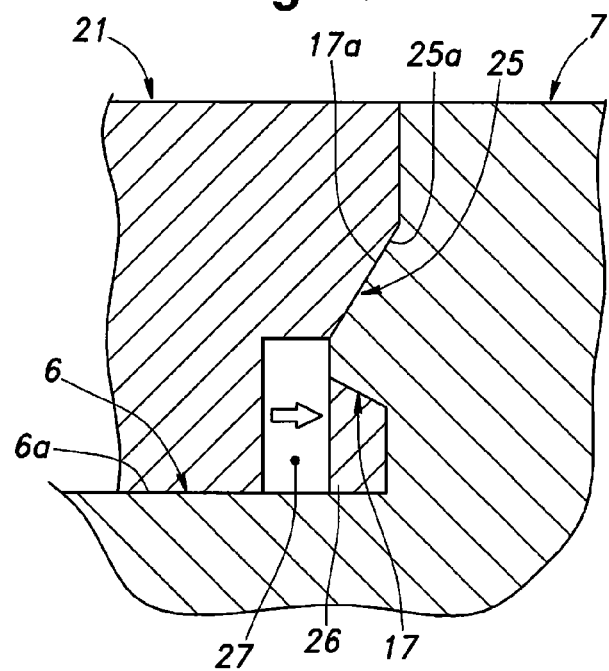
Figure 10A:
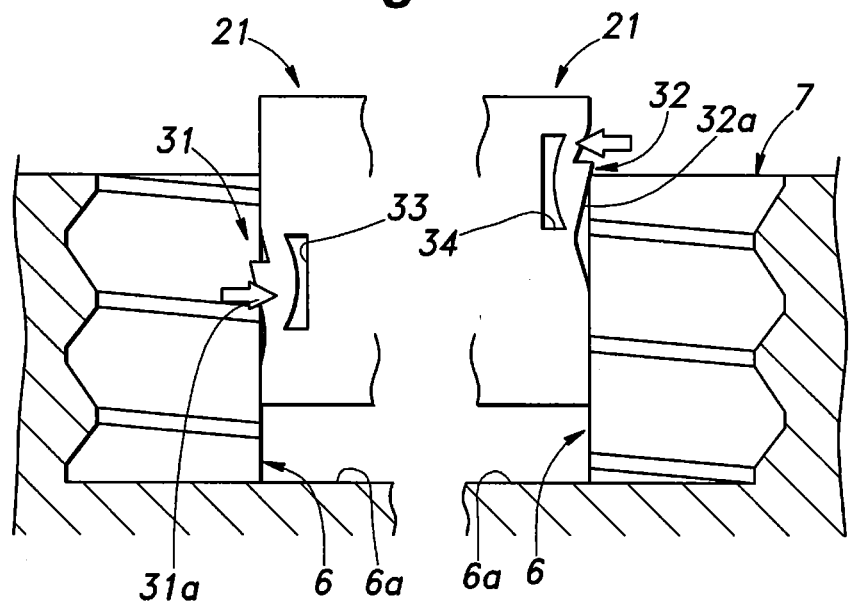
FIGS. 10a and 10b are other fragmentary sectional views showing the process of fitting the end deflector into the end deflector receiving recess.
Figure 10B:
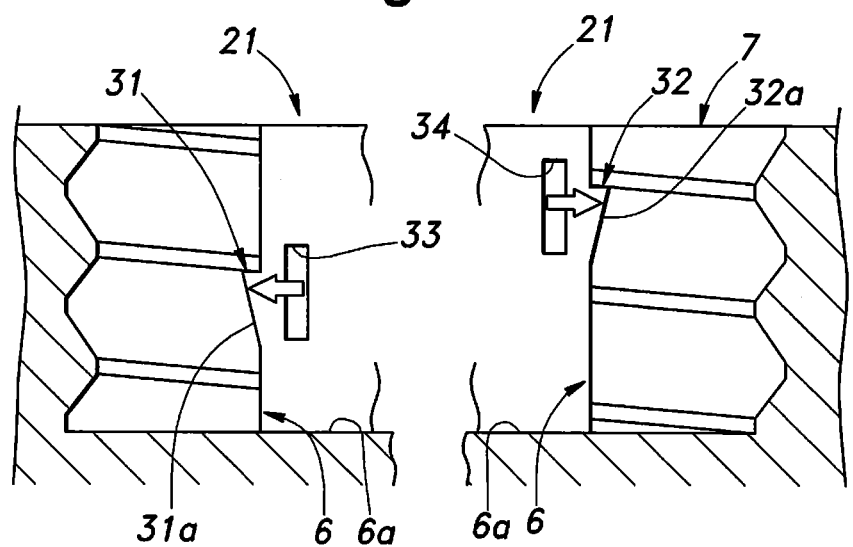

Once the end deflector 21 is fully received in the end deflector receiving recess 6 or the bottom face of the end deflector 21 has abutted the bottom surface 6a of the end deflector receiving recess 6, the engagement projection 17 of the end deflector receiving recess 6 is fully fitted in the engagement recess 25 of the end deflector 21 as shown in FIG. 9b on the one hand, and the first and second claws 31 and 32 are engaged by the corresponding parts of the thread 4 of the nut 7 as shown in FIG. 10b on the other hand. The arcuate profiles 31b and 32b of the first and second claws 31 and 32 ensure a firm and accurate engagement between the claws 31 and 32 and the corresponding parts of the groove 4 of the nut 7. As a result, the end deflector 21 is firmly retained in the end deflector receiving recess 6, and is accurately positioned in the end deflector receiving recess 6 with respect to the axial direction.

In the illustrated embodiment, the right radial face 21b of the end deflector 21 is crank-shaped such that a radially inwardly facing face 21e is defined in a radially middle part of the right radial face 21b. Once the end deflector 21 is fully received in the end deflector receiving recess 6, this radially inwardly facing face 21e abuts an opposing complementary surface 6e of the end deflector receiving recess 6 so that the end deflector 21 is accurately positioned in the end deflector receiving recess 6 with respect to the directions perpendicular to the axial direction.

The positioning of the end deflector 21 with respect to the end deflector receiving recess 6 is particularly important for ensuring a smooth connection between the thread of the nut 7 and the guide groove 23 and between the guide groove 23 and the ball return hole 15.

Thereafter, the balls 9 are filled into the raceway 8 and the ball return hole 15 while inserting a rod (or a tube) (not shown in the drawings) having an outer diameter slightly smaller than the minor (root) diameter of the thread shaft 3. The screw shaft 3 is then threaded into the nut 7 so as to push out the rod inserted in the nut 7 until the rod is completely pushed out of the nut 7.

Alternatively, the balls may be filled into the raceway 8 and the ball return hole 15 with only one of the end deflectors 21 fitted in the corresponding end deflector receiving recess 6 and the screw shaft 3 already threaded in the nut 7. The remaining end deflector 21 is fitted into the corresponding end deflector receiving recess 6 after all the balls 9 are filled into the raceway 8 and the ball return hole 15.

The ball screw 1 is typically used as a part of a linear actuator in machine tools, measuring instruments, etc. The screw shaft 3 is connected to a rotative actuator such as an electric motor and a reduction gear unit, and the nut 7 is connected to a component to be actuated via the flange 10. As the screw shaft 3 is turned, the nut 7 along with the component to be actuated is linearly actuated owing to the meshing between the threads of the screw shaft 3 and the nut 7 via the balls 9. The balls 9 are scooped up by one of the end deflectors 21 as the balls 9 reach the corresponding end of the raceway 8, and guided into the ball return hole 15 to be put back into the other end of the raceway 8 via the ball return hole 15. In the illustrated embodiment, because the nut 7 and the end deflectors 21 are made of plastic material, not only the overall weight of the ball screw 1 is reduced but also the noises that may be caused by the balls 9 traveling in the raceway 8 and the ball return hole 15 can be reduced.

Although the present invention has been described in terms of a preferred embodiment thereof, it is obvious to a person skilled in the art that various alterations and modifications are possible without departing from the scope of the present invention which is set forth in the appended claims. For instance, instead of the projection 17 in the inner circumferential surface 6d of the end deflector receiving recess 6 and the recess 25 in the outer circumferential face 21d of the end deflector 21, a projection 17 may be formed in the inner circumferential surface 6d of the end deflector receiving recess 6 while a corresponding recess is formed in the outer circumferential face 21d of the end deflector 21 for a similar effect.

The contents of the original Japanese patent application on which the Paris Convention priority claim is made for the present application as well as the contents of the prior art references mentioned in this application are incorporated in this application by reference.

The invention claimed is:

1. A ball screw, comprising a screw shaft having a helical thread formed on an outer circumference thereof, a nut having a central bore and defining a helical thread corresponding to the helical thread on the screw shaft on an inner circumferential surface thereof so as to define a spiral raceway, and a plurality of balls received in the raceway, the nut including a ball return hole extending therein in an axial direction and an end deflector receiving recess formed at least on one axial end thereof to complementarily receive an end deflector which defines a part of the raceway in cooperation with an opposing part of the nut and connects the raceway with the ball return hole, wherein the end deflector is provided with a tongue that projects from an inner circumferential face of the end deflector to guide the balls that are passed between the ball return hole and the raceway, and wherein the end deflector is provided with an engagement claw on a circumferential end face thereof, such that the engagement claw engages a part of the helical thread formed on the nut so as to retain the end deflector in the end deflector receiving recess of the nut in the axial direction.

2. The ball screw according to claim 1, wherein the claw includes an arcuate profile which is complementary to a corresponding contour of the thread of the nut.

3. The ball screw according to claim 1, wherein the end deflector is provided with a slot formed adjacent to the engagement claw.

4. The ball screw according to claim 1, wherein the end deflector is configured to be inserted axially into the end deflector receiving recess, and the engagement claw is provided with an axial slope which diminishes in height toward a forward end of the engagement claw.

5. The ball screw according to claim 1, wherein the end deflector is provided with a sector form including a pair of radial faces, an outer circumferential face and an inner circumferential face conforming to an inner circumferential surface of the nut.

6. The ball screw according to claim 5, wherein the engagement claw is provided on each of the radial faces adjacent to the inner circumferential face of the end deflector.

7. The ball screw according to claim 5, wherein the outer circumferential surface of the end deflector is provided with an engagement feature that cooperates with a corresponding engagement feature provided on a corresponding part of an inner surface of the end deflector receiving recess.

8. The ball screw according to claim 5, wherein at least one of the radial faces of the end deflector includes a radially inwardly facing part which abuts an opposing inner surface part of the end deflector receiving recess.

9. The ball screw according to claim 1, wherein the nut is provided with a ball return hole, and the end deflector is provided with a guide recess for guiding the balls between the raceway and the ball return hole.

10. The ball screw according to claim 1, wherein the screw shaft is made of metallic material, and the nut and the end deflector are made of plastic material.

* * * * *